United States Patent [19]

Dege et al.

[11] 4,253,900
[45] Mar. 3, 1981

[54] METHOD OF MAKING NOVEL TWO COMPONENT BIPOLAR ION EXCHANGE MEMBRANES

[75] Inventors: Gerald J. Dege, Flanders; Frederick P. Chlanda, Rockaway; Lester T. C. Lee, Parsippany; Kang-Jen Liu, Sommerville, all of N.J.

[73] Assignee: Allied Chemical Corporation, Morris Township, Morris County, N.J.

[21] Appl. No.: 772,786

[22] Filed: Feb. 28, 1977

[51] Int. Cl.$^3$ .............................................. C09J 5/02
[52] U.S. Cl. .............................. 156/309.3; 156/334; 156/308.6; 156/309.6; 204/180 P; 204/296; 210/506; 210/500.2; 428/327; 521/27; 521/31
[58] Field of Search ............................... 428/304, 327; 260/32.6 PQ, 2.1 R; 156/83, 309, 307, 334, 308; 204/180 P, 296, 301; 210/500 M, 506

[56] References Cited

U.S. PATENT DOCUMENTS

| | | |
|---|---|---|
| 2,631,127 | 3/1953 | D'Alelio .......................... 260/2.1 R |
| 2,827,426 | 3/1958 | Bodamer ......................... 204/180 P |
| 3,073,736 | 1/1963 | Lange .................................. 156/307 |
| 3,133,889 | 5/1964 | Hazenberg et al. ............. 260/2.1 E |
| 3,247,133 | 4/1966 | Chen .................................. 204/296 |
| 3,372,101 | 3/1968 | Kollsman ......................... 204/180 R |
| 3,562,139 | 2/1971 | Leitz .................................. 204/296 |
| 3,720,321 | 3/1973 | Coughlin et al. ............... 210/500 M |
| 3,765,983 | 10/1973 | Putzier ................................. 156/307 |
| 3,884,777 | 5/1975 | Harke et al. ........................ 204/296 |
| 3,928,110 | 12/1975 | Arconti et al. ...................... 156/308 |
| 3,945,927 | 3/1976 | Imai et al. ........................ 210/500 M |
| 4,116,889 | 9/1978 | Chlanda et al. ................... 204/130 P |

FOREIGN PATENT DOCUMENTS

883248  10/1971  Canada ..................................... 156/308

OTHER PUBLICATIONS

Bieber et al., "Sievar Peroxide–Zinc Alkaline Cells," *Industrial and Engineering Chemistry*, vol. 50, #9, 9-1958.

Gregor et al. "Characterization of Water-Splitting Properties of Bipolar Membranes", First Interim Technical Report, Office of Saline Water, U.S. Department of the Interior, 1-1970.

*Primary Examiner*—John J. Gallagher
*Attorney, Agent, or Firm*—Thomas D. Hoffman; Arthur J. Plantamura

[57] ABSTRACT

Superior bipolar membranes are prepared having high performances. The improvement is achieved by (1) using high performance component ion exchange membranes, and (2) controlling the method of joining two component membranes into a bipolar membrane. The method of preparation of high performance component ion exchange membranes is also disclosed.

11 Claims, No Drawings

METHOD OF MAKING NOVEL TWO COMPONENT BIPOLAR ION EXCHANGE MEMBRANES

BACKGROUND OF THE INVENTION

In recent years bipolar membranes have gained prominence as "water-splitters" and "acid-base" generators in electrodialysis operations. The main purpose of the bipolar membranes in such processes is to promote the dissociation of water into hydrogen and hydroxyl ions under the influence of an applied electrical potential. The commercial feasibility of all such processes requires the membranes to operate with low potential drops across them and with high current efficiencies at practical current densities and electrolyte concentrations.

Bipolar membranes consist of two oppositely charged ion exchange layers or membranes, either in close proximity or joined together. Each component is composed of a semi-permeable matrix material, for example, polyethylene, intimately containing a charge-bearing portion, for example, functionalized, cross-linked polystyrene. Usually strong acidic (sulfonic acid) and strong basic (quaternary ammonium) groups are introduced into the separate membranes. Each component is capable of transporting ions of opposite charge and hence also conducting an electric current. Under the influence of a direct current, cations or hydrogen ions present in the cationic-permeable component migrate toward the cathode and anions or hydroxyl ions in the anion-permeable component migrate toward the anode. This soon creates a depletion of ions in the vicinity of the interface and continuation of the flow of current is maintained only by the dissociation of water into hydrogen ions and hydroxyl ions. In order that the process is sustained, water must diffuse into the membrane to replenish that consumed by the dissociation.

The potential drop across the bipolar membrane is the sum of the individual potential drops of each component and the interface plus that required to split water ($E_m H^+, OH^- \approx 0.8$ v) $E_m = E$ anionic $+ E$ cationic $+ E$ interface $+ E_m H^+, OH^-$ The component membrane potentials may be minimized by increasing their exchange capacities, while lowering interface potential drops depends upon the means one uses to join the components.

Individual component membranes of the type discussed here are subject of a patent by J. F. A. Hazenberg and B. F. Knol (U.S. Pat. No. 3,133,889, May 19, 1964). Their joining together into a bipolar membrane by a hydraulic press is disclosed in U.S. Pat. No. 3,372,101. Bipolar membranes so prepared however are found to possess relatively high potential drops across them, evidently produced by the dislocation of fixed charges during fusion and the creation of microthin areas of essentially pure polyethylene. To avoid this drawback various means have been attempted such as by adding ion exchange resin mixtures between the components prior to fusion to increase the charge concentration at the interface to avoid this difficulty. In so far as is known, membranes made in this manner have not yielded practically suitable products. In any event there is a need for a durable bipolar membrane with a relatively low potential drop which would be attractive in various chemical process operations such as, for example, the treatment of effluent streams e.g., removal of $SO_2$ and the conversion of $H_2SiF_6$ to HF.

SUMMARY OF THE INVENTION

The present invention discloses a method by which additional lowering of the potential drop of the interface may be accomplished. More specifically it has been demonstrated that interface potentials may be minimized by more completely filling the interface with a monobead layer of ion exchange resin, either as a mixture of anion and cation resins, or separately. It has been found that more complete interface covering may be accomplished by using (a) selected small size (micro fine) resins and (b) resins with narrow particle size distributions, either alone or mixed with oppositely charged resins with selected particle size distributions. The membrane potentials so obtained (1–2 volts at 100 amp./ft$^2$) are commercially attractive and the membranes perform with high current efficiencies at realistic current densities and electrolyte concentrations.

DESCRIPTION OF THE PREFERRED EMBODIMENTS

Reference is made to TABLE I wherein a series of membranes, sampled according to the procedure disclosed below, are recorded. Resulting potential drops across bipolar membranes which were prepared under various conditions are set forth.

Commercially available ion exchange membranes were employed, e.g. Ionac Chemical Company's strong base (MA3475R) (strongly basic, anionic, heterogeneous, permselective anion exchange membranes) and strong acid (MC3470) (strongly acidic, heterogeneous, permselective cation exchange membranes) membranes and AMF's strong base (A100) (an anionic membrane having a polyethylene backbone containing polyelectrolytes of quaternized ammonium type) and strong acid (C100) (a cationic membrane having polyethylene backbones containing polyelectrolytes of sulfonic acid type) membranes. Likewise, commercially available ion exchange resins, e.g. Ionac Chemical Company's strong base (CGA541 (beads of strong base—alkyl quaternary ammonium chloride 200–400 mesh —7% crosslinked polystyrene—divinylbenzene (S-DVB) matrix); MFA-6 (micro fine (<35 microns) resin beads of alkyl quaternary ammonium chloride or sulfate —6% crosslinked S-DVB matrix)) and strong acid (CGC241, (beads of strong acid, as the sodium salt of sulfonic acid 8% crosslinked S-DVB matrix) MFC-6, (micro fine resin as the sodium Salt of Sulfonic Acid —6% crosslinked S-DVB matrix) MFC-10 (micro fine resin as the sodium salt of sulfonic acid —10% crosslinked S-DVB matrix)) resins and Dow Chemical Company's strong base (Dowex 1x16, (strongly basic beads of 20–50 mesh resin —16% crosslinked S-DVB matrix) Dowex 1x8 (strongly basic beads of 20–50 mesh resin, 8% crosslinked S-DVB matrix)) and strong acid (Dowex 50Wx8 (strongly acid beads of 20–50 mesh resin, 8% crosslinked S-DVB matrix), Dowex 50Wx12 (strongly acid beads of 20–50 mesh resin, 12% S-DVB matrix)) resins, were also employed. Both component membranes were first converted into their salt form and vacuum dried overnight over $P_2O_5$ at 40° C. Then 2¼"×2¼" specimens were coated, each on one side only, with a dimethyl formamide or methanol slurry of the desired resin mixture, usually a 50/50 mixture of the anionic and cationic resins. In addition to the resin solvents dimethyl formamide and methanol, various other solvents which are preferably a partial solvent for the membrane may be employed, such as carbon tetrachloride, chloroform, methylene chloride, 1,2-dichloroethane, 1,1,2 trichloroethane, 1,1,2,2-tetrachloroethane, dimethyl acetamide, decalin tetralin and cyclohexane and the like and various mixtures thereof, may be used. Ten minutes were allowed for the excess solvent to evaporate before sandwiching the two membranes between two pieces of 3 mil aluminum foil. They were next inserted between two pre-heated, 6" diameter steel discs, at 131°–150° C. The whole ensemble was then placed on a hydraulic press and the membranes were fused together for 2.5 minutes at 131°–150° C. at 1500–3000 psi. It will be understood that any suitable known means in addition to fusion by a hydraulic press may be used such as, for example, sonic bonding, thermal impulse, pneumatic press and the like. After cooling in the press to room temperature, the aluminum foil was peeled from the membrane, which was then equilibrated in 1 N KF for 48 hours. Its potential drop was measured in an electrodialysis cell while mounted between 1 N HCl and 1 N KOH. The foregoing procedure was used when fusing together polyethylene matrix membranes, such as AMF's A100 and C100. For Ionac MC3470 and MA3475R membranes, however, it was found that good fusion was obtained after 2.5 minutes at 93°–95° C. and 900–2000 psi if DMF was used as the resin slurry media.

without ion exchange resins between them, despite the fact that good bonding was achieved. Membranes 2 to 4 show the potential drop decrease one obtains by (a) fusing a resin mixture between the components and (b) the additional decline due to the use of smaller particle size (microfine) resins. However, potential drops of 4.8 volts (at 72 amp/ft$^2$) are of no commercial interest. The same sort of effect was observed with AMF component membranes as seen with membranes numbered 5 to 7. The latter membrane was prepared with a mixture of Dowex 50 Wx8 and Dowex Ix8 resins which were previously pulverized at liquid nitrogen temperatures in a freezer mill to particle sizes of 2–28$\mu$. The lowering of the potential drop to about 2 volts illustrates again the importance of particle size in bipolar membrane preparation.

Ionac microfine resins ($\leq 40\mu$) were used in the preparation of membranes 8 to 11, also with AMF component membranes. In specimen 8, both resins distributions ranged from 4–40$\mu$. The resulting potential drop was 2.11 volts at 72 amp/ft$^2$. It is seen however, that further lowering of the potential drop was obtained by the use of the combination of Ionac MFC-10 with the MFA-6 resin. The former resin was found to have the narrow particle size distribution of 7–14$\mu$. The resulting potential drops of 1.40–1.78 volts were among the lowest obtained. Microscopic examination of similarly prepared membranes containing the same resin mixtures

TABLE I
ELECTRICAL POTENTIAL DROPS ACROSS VARIOUS FUSED BIPOLAR MEMBRANES

| Membrane No. | Component Membranes | RESIN MIXTURE (50/50 Mixture in DMF Slurry) | Fusion Conditions | Em (volts) at 72 amp/ft$^2$ |
|---|---|---|---|---|
| 1 | MC3470 MA3475R (IONAC) | None (DMF Only) | 2.5 min.,95° C.,900 psi | 25 |
| 2 | MC3470 MA3475R (IONAC) | Dowex 50 W × 8 (14–91$\mu$) Dowex I × 8 (56–91$\mu$) | 2.5 min.,93° C.,1800 psi | 16 |
| 3 | MC3470 MA3475R (IONAC) | Dowex 50 W × 12 (28–91$\mu$) Dowex I × 16 (7–91$\mu$) | 2.5 min.,93° C.,1800 psi | 11 |
| 4 | MC3470 MA3475R (IONAC) | IONAC MFC-10 (7–14$\mu$) IONAC MFA-6 (4–40$\mu$) | 2.5 min.,93° C.,1800 psi | 4.8 |
| 5 | C100 A100 (AMF) | Dowex 50 W × 8 (14–91$\mu$) Dowex I × 8 (56–91$\mu$) | 2.5 min.,130° C.,1500 psi | 17 |
| 6 | C100 A100 (AMF) | IONAC CGC 241 (14–56$\mu$) IONAC CGA 541 (14–70$\mu$) | 2.5 min.,130° C.,1500 psi | 10 |
| 7 | C100 A100 (AMF) | Pulverized Dowex 50 W × 8 (2–28$\mu$) Pulverized Dowex I × 8 (2–28$\mu$) | 2.5 min.,135° C.,1500 psi | 2.05 |
| 8 | C100 A100 (AMF) | IONAC MFC-6 (4–38$\mu$) IONAC MFA-6 (4–40$\mu$) | 2.5 min.,139° C.,1500 psi | 2.11 |
| 9 | C100 A100 (AMF) | IONAC MFC-10 (7–14$\mu$) IONAC MFA-6 (4–40$\mu$) | 2.5 min.,133° C.,1500 psi | 1.78 |
| 10 | C100 A100 (AMF) | IONAC MFC-10 (7–14$\mu$) IONAC MFA-6 (4–40$\mu$) | 2.5 min.,136° C.,1500 psi | 1.47 |
| 11 | C100 A100 (AMF) | IONAC MFC-10 (7–14$\mu$) IONAC MFA-6 (4–40$\mu$) | 2.5 min.,147° C.,3000 psi | 1.40 |
| 12 | C100 A100 (AMF) | Classified IONAC MFA-6 (>38$\mu$) Classified IONAC MFC-6 | 2.5 min.,139° C.,1580 psi | 4.37 |
| 13 | C100 A100 (AMF) | Classified IONAC MFA-6 (>22$\mu$) Classified IONAC MFC-6 | 2.5 min.,139° C.,1580 psi | 3.06 |
| 14 | C100 A100 (AMF) | Classified IONAC MFA-6 (12–22$\mu$) Classified IONAC MFC-6 | 2.5 min.,139° C.,1580 psi | 2.17 |
| 15 | C100 A100 (AMF) | Classified IONAC MFA-6 (<12$\mu$) Classified IONAC MFC-6 | 2.5 min.,139° C.,1580 psi | 1.69 |
| 16 | C100 A100 (AMF) | IONAC MFC-10 (7–14) | 2.5 min.,133° C.,1500 psi | 2.10 |
| 17 | C100 A100 (AMF) | Polyethylene Film Containing 75% (by weight) Pulverized MFC-6 (Em = 0.4) (4–38$\mu$) | 2.5 min.,136° C.,1500 psi | 2.27 |

The first membrane in Table I illustrates the high potential drop resulting when components are fused which had been previously dyed (MFC-10 resins with methylene blue and MFA-6 with methyl orange) clearly illustrates the following points:

(a) the resin is fused in a somewhat mono-bead layer, bead-to-bead, in a random distribution of anionic and cationic beads, between the membranes.

(b) normal to the film surface the membrane is almost completely covered randomly with anionic and cationic beads, with the smaller cationic beads, 7–14$\mu$, very effectively filling the voids between the larger sized anionic beads, 4–40$\mu$. This closely-packed arrangement of beads has repeatedly been obtained with the combination of the MFC-10/MFA-6 mixture and has yielded the lowest potential drop membranes of this type.

Further evidence of the effect of particle size upon membrane potential is seen with membranes 12 to 15. The MFA-6 and MFC-6 resins were first classified into particles (a) greater than 38$\mu$, (b) greater than 22$\mu$, (c) from 12–22$\mu$ and finally (d) less than 12$\mu$. The four categories of anionic and cationic resins were then prepared as 50/50 mixtures and applied to the membranes as DMF slurries prior to fusion, by the previously described methods. Once more it is seen that membranes (specimen 15) prepared from the smallest size resins had the lowest potential drop. In specimen 16, the MFC-10 (7–14$\mu$) resin was used alone and a fairly low potential drop also resulted. Evidently the narrow particle size distribution of the resin also allows it to form a closely-packed, somewhat mono-bead layer, which effectively fills the interface across the entire membrane. A similar result was obtained with specimen 17, where a three-component bipolar membrane was prepared. Here, between the anionic and cationic components was placed a polyethylene film containing 75% by weight pulverized MFC-6 polyethylene resin (4–38$\mu$). In addition to polyethylene other polyolefins or halogenated polyolefins may be used such as polypropylene, copolymers of polyethylene and polypropylene, polytrichlorofluoroethylene and the like may be employed. The film was prepared on a roller mill, then hydraulically pressed to a thin film, at 170° C. and 60 tons, which had a potential drop of 0.4 volts at 72 amp/ft.$^2$ in. When fused between two component membranes, the bipolar membrane produced had a potential drop of 2.27 v at 72 amp/ft.$^2$ and microscopically, was found to have a closely packed, mono-bead layer at its interface.

In Table II are recorded the potential drops measured on bipolar membranes prepared with the MFC-10/MFA-6 resin mixture fused between experimental (non-commercial) anionic and cationic component membranes. The component membranes ranged from 2.4 to 5.8 mils thick, containing from 15–25% polystyrene with 2–10% divinylbenzene. They had individual resistances and current efficiencies comparable to commercial anionic and cationic membranes. The final bipolar membranes were found to have potential drops ranging from 1.26–1.87 volts at 72 amp/ft$^2$, but operated successfully in electrodialysis cells at higher current densities, e.g. 100–153 amp/ft$^2$, and both higher acid, 8.4–10.1% HF, and base, 3.8–7.1% KOH, concentrations, than those previously discussed, The individual component membranes were prepared from polystyrenated high density polyethylene films which were prepared by the following method. A 5"×11" sheet of HDPE film was tared and suspended in a stainless steel trough containing a mixture of 83.5–97.5 parts freshly distilled styrene, 2–10 parts commercial (55%) divinylbenzene, and from 0.1–0.5 parts benzoyl peroxide at the desired impregnation temperature from 70°–80° C. After equilibrium swelling of the film was obtained (15–45 minutes) the film was withdrawn, excess liquid polymerizate squeezed from its surface, and it was then clamped firmly between two pre-heated, aluminum foil (3 mil) covered, glass plates. This ensemble was then completely submerged in a saturated sodium sulfate salt bath maintained from 75°–85° C. and polymerized over night (18 hours). The film was next removed and excess polystyrene removed from its surface. The film was rinsed in distilled water and vacuum dried over P$_2$O$_5$ at 45° C. and 1 mm. Hg. The films contained from 15–25% polystyrene and if higher polystyrene contents were desired the entire process was repeated.

The styrenated sheets were converted into anionic membranes by immersion into chloromethylmethylether containing 2.5 weight percent SnCl$_4$ and refluxing (59° C.) for six hours before removing and quaternizing by immersion in a 25% trimethylamineacetone solution for 18 hours at 25°–30° C. The membranes were then equilibrated for 48 hours in IN KF.

Cationic membranes were prepared by first pre-swelling the styrenated films in carbon tetrachloride for 18–24 hours at 25°–30° C. before immersion in a 65/35 chlorosulfonic acid/carbon tetrachloride mixture at room temperature, with stirring, under a dry nitrogen atmosphere for 3 hours. The sulfonyl chloride groups so introduced were hydrolyzed by immersion into IN H$_2$SO$_4$ at 45° C. for 48 hours.

The polystyrene content of the component anoinic or cationic membrane may range from 15 to 50 percent by weight.

The cross-linking agent employed is equivalent to that produced by a divinylbenzene-styrene swelling solution containing from 1 to 20 weight percent commercial 55% divinylbenzene.

TABLE II

POTENTIAL DROPS ACROSS FUSED BIPOLAR MEMBRANES PREPARED FROM EXPERIMENTAL COMPONENTS

| Membrane No. | $\frac{\text{Anionic}}{\text{Cationic}}$ Compositions* | | | | | Fusion Conditions | |
|---|---|---|---|---|---|---|---|
| | % PS | % DVB | Thick. (mil) | $\frac{R_m^{F-}}{R_m^{H+}}$ | $\frac{n\text{HCl}}{n\text{KOH}}$ | (50/50 MFC-10/MFA-6 Mixture applied as a DMF slurry, 7-40) | Em(volts) at (72 amp/ft$^2$) |
| 18 | $\frac{18}{23}$ | $\frac{5}{5}$ | $\frac{2.5}{2.6}$ | $\frac{3.31}{0.22}$ | $\frac{0.50}{0.94}$ | 0.5 min., 170° C., 6000 psi | 1.26 |
| 19 | $\frac{20}{25}$ | $\frac{2}{2}$ | $\frac{5.6}{2.4}$ | $\frac{4.20}{0.22}$ | $\frac{0.56}{0.87}$ | 0.5 min., 170° C., 6000 psi | 1.87 |
| 20 | $\frac{20}{25}$ | $\frac{2}{2}$ | $\frac{5.6}{2.4}$ | $\frac{4.20}{0.22}$ | $\frac{0.56}{0.87}$ | 0.5 min., 160° C., 6000 psi | 1.57 |
| 21 | $\frac{20}{15}$ | $\frac{2}{5}$ | $\frac{5.6}{5.6}$ | $\frac{3.24}{0.44}$ | $\frac{0.56}{1.03}$ | 0.5 min., 170° C., 6000 psi | 1.42 |

TABLE II-continued
POTENTIAL DROPS ACROSS FUSED BIPOLAR MEMBRANES PREPARED FROM
EXPERIMENTAL COMPONENTS

| Membrane No. | $\frac{\text{Anionic}}{\text{Gationic}}$ Compositions* | | | | | Fusion Conditions | |
|---|---|---|---|---|---|---|---|
| | % PS | % DVB | Thick. (mil) | $\frac{R_m^{F-}}{R_m^{H+}}$ | $\frac{\text{nHCl}}{\text{nKOH}}$ | (50/50 MFC-10/MFA-6 Mixture applied as a DMF slurry, 7–40) | Em(volts) at (72 amp/ft²) |
| 22 | $\frac{21}{21}$ | $\frac{10}{10}$ | $\frac{5.8}{5.8}$ | $\frac{1.32}{0.55}$ | $\frac{0.58}{0.94}$ | 0.5 min., 160° C., 6000 psi | 1.71 |

*% PS = Weight % polystyrene within high density polyethylene film.
%DVB = Weight percent commercial divinylbenzene (55% DVB) in initial styrenation mixture.
$R_m^{F-}$ = Membrane resistance (ohm-cm²) in 1N KF.
$R_m^{H+}$ = Membrane resistance (ohm-cm²) in 1N H₂SO₄.
nHCl = Current efficiency in 1N HCl v. O. 1N HCl.
nKOH = Current efficiency in 1N KOH v. O. 1N KOH.

The invention will be further illustrated from the following examples in which, unless expressly stated otherwise, parts are parts by weight and temperatures are in degrees Celsius.

EXAMPLE 1

A fused bipolar member was prepared by applying a 50/50 mixture of pulverized Dowex 50 W8, Dowex Ix8 resin mixture (2–28μ particle size) as a DMF slurry, to one side of AMF A100 and C100 membranes. After allowing excess solvent to evaporate for 10 mixtures, the membranes were placed between two 3 mil aluminum foil sheets, with the resin coated faces toward one another, clamped between two 6" diameter pre-heated discs, and fused together on a hydraulic press for 2.5 minutes at 135° C. and 1500 psi. The product was equilibrated in 1 N KF for 48 hours and found to have a potential drop of 2.05 volts at 72 amp/ft². Performance test in an electrodialysis cell with the membrane mounted between 3% HF and 0.7% KOH and with a current density of 93 amp/ft², yielded a current efficiency of 75% for base generation and a current efficiency of 72% for acid generation.

EXAMPLE 2

A fused bipolar membrane was prepared by applying a 50/50 mixture of Ionac MFC-10 (7–14μ) and MFA-6 (4–40μ) resins as a methanol slurry to one side of both an AMF A100 and C100 ion exchange membrane. After allowing 10 minutes for the excess solvent to evaporate, the membranes were placed with the resin coated faces toward one another between two 3 mil sheets of aluminum foil. The sandwich was then placed between two preheated 6" diameter steel plates and the membranes were fused together by placing in a hydraulic press for 2.5 minutes at 136° C. at 1500 psi. After cooling to room temperature, the membrane was removed and equilibrated in 1 N KF for two days. It was found to have a potential drop of 1.47 volts at 72 amp/ft². When mounted between 6% HF and 0.6% KOH in an electrodialysis cell, it was found to operate at an acid current efficiency of 85% and a base current efficiency of 91% at a current density of 93 amp/ft².

EXAMPLE 3

A fused bipolar membrane was prepared by first preparing a composition containing 75% pulverized Ionac MFC-6 ion exchange resin (4–38μ) and 25% high density polyethylene (HDPE) film on a roller mill at 140° C. and then pressing to a thin film on a hydraulic press at 170° C. and 60 tons. The film had a potential drop of 0.4 volts across it at 72 amp/ft². The resin containing film was then fused between and A100 and a C100 membrane on a hydraulic press for 2.5 minutes at 136° C. and 1500 psi. After equilibration for 48 hours in 1 N KF the resulting bipolar membrane was found to have a voltage drop of 2.27 volts at 72 amp/ft². It performed in an electrodialysis cell between 2.3% HF and 0.6% KOH at an acid current efficiency of 85% and a base current efficiency of 93% at a current density of 74 amp/ft².

EXAMPLE 4

A fused bipolar membrane was prepared by fusing a 50/50 Ionac MFC-10 (7–14μ)/MFA-6 (4–38μ) ion exchange resin mixture, applied as a DMF slurry, between anionic and cationic component membranes, on a hydraulic press for 0.5 minutes at 170° C. and 1500 psi. The anionic membrane was prepared from 5.6 mil HDPE film and contained 20% polystyrene with 2% DVB. The cationic membrane was prepared also from 5.6 mil HDPE film and contained 15% polystyrene with 5% DVB. The methods previously described in the specification were used to styrenate and functionalize these components. The resulting bipolar membrane was found to have a potential drop across it of 1.42 volts. It performed in an electrodialysis cell when mounted between 9.2% HF and 4.0% KOH, at 152 amp/ft², at a base current efficiency of 75% and an acid current efficiency of 81%. At the same current density, between 8.7% HF and 6.3% KOH it had a base current efficiency of 75% and an acid current efficiency of 78%.

EXAMPLES 5–7

The procedure of Example 4 is repeated using instead the composition set forth in Table III, employed in styrenation temperature of 75° C. and a fusion temperature of 140° C. for a period of 2.5 minutes.

TABLE III

| Example No. | Matrix Film | Percent Polystyrene Content | Percent DVB* |
|---|---|---|---|
| 5 | polypropylene | 18 | 2 |
| 6 | polyethylene-polypropylene copolymer | 20 | 5 |
| 7 | polytrifluorochloroethylene | 23 | 8 |

*Weight percent commercial (55%) divinylbenzene in the initial styrenation mixture.

It will be apparent to those skilled in the art that various modifications may be in the details provided by way of illustrations and the invention is not to be limited thereby except as may be recited in the claims which follow.

We claim:
1. A process for manufacturing a high performance composite bipolar membrane which comprises substan- tially uniformly impregnating one side of (a) a component polymeric strongly acidic cationic exchange membrane consisting essentially of a polystyrene-divinylbenzene-polyolefin composition wherein the polystyrene content of the component strongly acidic cationic membrane ranges from 15 to 50 percent by weight and wherein the cross-linking content of the component strongly acidic cationic membrane is equivalent to that produced by a divinylbenzene-styrene swelling solution containing from 1 to 20 weight percent of divinylbenzene and chemically treating the polystyrene-divinylbenzene-polyolefin composition such that the aromatic nuclei in the composition are chemically functionalized with strongly acidic cationic exchange groups and one side of (b) a component polymeric strongly basic anionic exchange membrane consisting essentially of a polystyrene-divinylbenzene-polyolefin composition wherein the polystyrene content of the component strongly basic anionic membrane ranges from 15 to 50 percent by weight and wherein the cross-linking content of the component strongly basic anionic membrane is equivalent to that produced by a divinylbenzene-styrene swelling solution containing from 1 to 20 weight percent of divinylbenzene and chemically treating the polystyrene-divinylbenzene-polyolefin composition such that the aromatic nuclei in the composition are chemically functionalized with strongly basic anionic exchange groups with (c) a strongly basic anionic or strongly acidic cationic ion exchange resin or a mixture thereof, and having a resin particle size not greater than about 40 microns, dispersed in (d) an organic solvent liquid which is at least a partial solvent for said component membranes (a) and (b) and at least a partial solvent for said ion exchange resin (c), sandwiching said ion exchange resin between said component membranes and fusing said component membranes to form a unitary composite bipolar membrane having a potential drop of no more than about 2 volts at a current density of 72 amp/ft$^2$.

2. The process of claim 1 wherein at least one of the component polymeric ion exchange membranes is polystyrene-divinylbenzenepolyethylene composition.

3. The process of claim 1 wherein at least one of the component polymeric ion exchange membranes is polystyrene-divinylbenzenepolypropylene composition.

4. The process of claim 1 wherein at least one of the component polymeric ion exchange membranes is polystyrene-divinylbenzenepolyethylene-polypropylene copolymer composition.

5. The process of claim 1 wherein at least one of the component polymeric ion exchange membranes is polystyrene-divinylbenzenepolytrifluoro chloroethylene composition.

6. The process of claim 1 wherein (d) the organic solvent liquid is selected from the group consisting of methanol and dimethyl formamide.

7. The process of claim 1 wherein the ion exchange resin comprises particles not greater than about 40 microns, possessing a controlled particle size distribution, and wherein a particularly closely packed approximately mono-bead layer results from the combination in approximately a 50/50 mixture of a relatively broad particle size distribution cationic exchange resin of about 4–40 microns, with a narrow particle size distribution anionic exchange resin of about 7–14 microns.

8. The process of claim 1 wherein the resin is applied to one surface of each of the membranes prior to fusion, as a slurry.

9. The process of claim 1 wherein the resin inserted between the anionic and cationic exchange membranes is in the form of a milled and pressed film having a composition composed of about 75% by weight of uniformly dispersed resin selected from the group consisting of anionic and cationic exchange resin and mixtures thereof having a particle size not in excess of about 40 microns, with about 25% by weight of a polyolefin, and whereby said film enclosed in membranes (a) and (b) is fused under heat and pressure to a unitary bipolar membrane having a continuous layer of resin at its interface.

10. The process of claim 1 wherein the anionic and cationic component membranes are fused together, with the resin in between, by means of a hydraulic press for about 0.5 to 5 minutes at 130°–170° C. and from 1000–6000 psi.

11. The process of claim 1 wherein the anionic and cationic component membranes range from 0.5 to 20 mils thick.

* * * * *